United States Patent Office 3,448,046
Patented June 3, 1969

3,448,046
POLYOL CONTAINING CHLORINE AS A FLAME-RETARDING AGENT
Edmund Schalin, Mentor, Ohio, assignor to Diamond Shamrock Corporation, a corporation of Delaware
No Drawing. Filed Apr. 19, 1965, Ser. No. 449,324
Int. Cl. C09k 3/28; C08g 41/00
U.S. Cl. 252—8.1                    7 Claims

ABSTRACT OF THE DISCLOSURE

A polyol having a hydroxyl number ranging from 25 to 600 and having incorporated therein from 0.5 percent to about 25 percent, by weight, of at least chlorine as flame-retarding agent, is blended with from 0.5 percent up to 25 percent, based on the weight of the polyol, of a compound having at least one epoxide group in its structure, said epoxide group-containing compound serving to scavenge free acid from the polyol and reduce the acidity thereof. Polyols so treated when subsequently reacted with polyisocyanates, produce large polyurethane foam masses showing no thermal degradation, e.g., coloration, in center sections thereof.

---

This invention relates to flame-retardant urethane polymer compositions normally prepared from polyols incorporating flame-retarding agents. More particularly, this invention relates to the method of treating such polyols to minimize their acidity and also to reduce heat degradation of large cellular polyurethane masses prepared therefrom.

As now well known in the art, urethane polymer materials may be prepared by reacting polyhydroxy compounds with polyisocyanates. Depending upon the manner in which they are prepared, these polymers may be either cellular or non-cellular products which may vary from extremely soft elastomeric products to hard, rigid articles. Exhibiting excellent physical and chemical properties, polyurethanes have enjoyed ever increasing use in industry. For example, cellular polyurethanes, commonly designated in the art as "foams," have excellent strength, durability, low density, uniformity and good insulating properties and can be used for many purposes.

However, many commercially available polyurethanes are flammable materials, i.e., they will burn rapidly and freely when contacted with a flame. This property has in many instances prohibited their use in applications where safety and non-flammability are of prime importance such as, for example, the use of cellular polyurethanes as insulation in various types of construction or in electrical equipment.

Many different methods have been utilized heretofore to make urethane polymers flame-retardant. These methods have involved, for example, incorporating flame-retarding agents such as chlorine, fluorine, bromine, phosphorus or antimony compounds. More recently, polyurethanes of excellent flame resistance as well as good chemical and physical properties have been prepared by utilizing in the urethane reaction, a polyol component containing, in chemical combination therein, one or more flame-retarding agents, e.g., halogen and/or antimony. However, it has been observed that when large foam masses such as those produced for slab-stock application are prepared from these polyol compositions, such foam products have oftentimes been scorched or badly discolored in or toward the center sections thereof, indicating degradation of the foam. Although it is not known precisely what causes this degradation, it is believed to be due primarily to the exothermic heat of the urethane reaction which is dissipated slowly from within the foam mass because of the excellent insulating properties of the foam. Also, at the elevated reaction temperatures involved, degradation of the foam material may be accelerated by the presence of acids such as HCl. It can readily be understood that discoloration such as heretofore observed in large blocks of foam stock prepared from flame-retardant foam mixtures as previously described is undesirable from a marketing standpoint. Likewise, it is understandable that degradation, as evidenced by discoloration, might adversely affect physical properties of the foam.

It is an object of this invention, therefore, to provide a flame-retardant urethane plastic product exhibiting improved resistance to heat degradation.

It is another object of this invention to provide a method of modifying a polyurethane reaction mixture so that large polyurethane foam masses prepared therefrom exhibit an improved resistance to heat degradation.

It is a further object of this invention to provide flame-retardant polyurethane foam products exhibiting improved resistance to heat degradation, which foam products are prepared from a polyol composition containing chemically combined and/or physically incorporated flame-retarding agents.

A still further object of this invention is to provide flame-retardant polyurethane foam products of improved resistance to heat degradation from an admixture of a polyol composition incorporating flame-retarding agents and at least one other polyhydroxy component.

It is still another object to provide, for the preparation of flame-retardant polyurethane foams, a polyol composition of reduced acidity which will be non-corrosive to metals in contact therewith during foaming operations.

These and other objects are accomplished in accordance with the following detailed description of the invention.

The present invention comprises incorporating into a polyol composition which contains one or more halogens or mixtures of halogen with phosphorus or antimony and which polyol is to be used in the preparation of urethane plastic products, especially foam materials, a minor amount of a compound having at least one epoxide group in its structure. When large foam masses are subsequently prepared from the thus treated polyol composition, it is observed that the center of these foam blocks or slabs generally show improved resistance to heat degradation, as evidenced by a substantial reduction in discoloration, by comparison to foam products prepared from an untreated polyol. The foam products produced in the preferred embodiments of this invention exhibit no susceptible discoloration nor uneven color.

Specific compounds containing epoxide groups which suitably may be employed in this invention include alkylene oxides, such as ethylene oxide, propylene oxide, butylene oxide and the like; aralkylene oxides, e.g., phenyl ethylene oxide or phenoxy propylene oxide; halogenated alkylene oxides such as epichlorohydrin; and epoxy resins having an epoxy value of at least 0.10 per 100 grams of resin such as, for example, the commercially available glycidyl ethers produced by reaction of epoxy compounds with aromatic compounds, e.g., phenols, containing at least dihydric functionality. For the sake of convenience, these compounds are described generally as "epoxide materials" in the detailed description of the invention. Of these epoxide materials, propylene oxide, in most instances, may be preferred for use largely because of its low cost and easy handling characteristics. For this reason, therefore, specific reference may be made hereinafter to propylene oxide. However, it is to be understood that such specific reference does not serve to limit the scope of the present invention, but as being merely illustrative thereof.

As described hereinabove, the epoxide material, e.g., propylene oxide is incorporated into the polyol component prior to use in the foaming reaction. Intimate admixture of the polyol component and the propylene oxide can be effected by heating these components together with agitation for about 30 minutes to 2 hours, depending on the temperature used. However, in most instances, it has been found entirely satisfactory to physically blend these components at ambient temperature until a homogeneous solution is obtained.

After treatment, the polyol composition generally may be reacted immediately with a polyisocyanate and other urethane formulation ingredients, as desired, to prepare urethane plastic products. When the treated polyol composition is employed in foam preparation, however, it is recommended that it be allowed to stand for at least 1 hour prior to use, as foam products accordingly obtained exhibit a substantial improvement in heat stability. When the treated polyol material is stored for at least 24 hours prior to its use in foaming operations, foam products of particularly improved thermal stability are then obtained. Of course, the treated polyol composition can be stored for extended periods of time prior to use without any susceptible loss of its improved heat stability characteristics.

In the practice of this invention, the epoxide material generally may be employed in amounts ranging from from 0.5 to 25 percent, based on the weight of the polyol composition, with the preferred amount thereof ranging from 0.5 to 5 percent, based on the weight of polyol. However, as is shown hereinafter by specific examples, the amount of epoxide material preferably employed will vary within this range depending upon the particular compound used. For example, an amount of propylene oxide ranging from 1 to 2 percent, based on the weight of the polyol composition generally imparts the desired thermal stability improvement therein and, accordingly, is the amount of propylene oxide preferred for use.

As previously described, the polyol composition treated in the practice of this invention contains as the flame-retarding component one or more halogens, e.g., chlorine, fluorine and/or bromine and also mixtures of at least one of these halogens with phosphorus or antimony. The flame-retarding component may be incorporated into the polyol composition by blending or may be chemically combined therein through chemical reaction. Polyol compositions most advantageously employed in the process of this invention contain chemically-combined chlorine, while the polyol composition which is presently most preferred for use contains, as discussed more fully hereinafter, both chemically-combined chlorine and antimony.

The polyols, i.e., hydroxyl-containing compounds employed herein are monomeric and polymeric polyols having at least two functional groups per molecule. Such compounds generally include polyalcohols and hydroxyl-containing polyesters, polyethers or polyesteramides with the polyethers presently being preferred for use. Suitable polyether polyols may be either branch-chain or linear polyether polyols or mixtures thereof which have at least one and preferably a plurality of acyclic ether linkages and contain at least two functional hydroxyl groups. Branch-chain polyether polyols may be obtained by reacting glycols or alkylene oxides or mixtures thereof with polyhydric compounds such as glycerol, trimethylol propane, trimethylol phenol, trimethylol benzene, pentaerythritol, sorbitol, sucrose, various glycosides and the like. Similarly, linear or substantially linear polyether polyols are obtained by poly-addition reactions, i.e., polymerization, copolymerization, etc., of alkylene oxides with, for example, water or with alkylene or dialkylene glycols or heterocyclic ethers, either singly or in combination.

In practice, the particular polyol or polyol mixture treated in the process of this invention will vary widely in average molecular weight and in functionality, depending upon the end use of the composition. For use in preparing rigid polyurethane foams, for example, the polyol composition generally has a hydroxy number of from 250 to 600 and has at least three and preferably more than three functional hydroxyl groups per molecule. A polyol composition suitable for rigid foam preparation may of course, also comprise a mixture of such a polymeric polyol with either monomeric polyhydric compounds having at least two functional hydroxyl groups and/or with other similar polyols. On the other hand, for the preparation of semi-rigid and flexible foam products, the polyol composition typically has less functionality, is of higher molecular weight, and has a hydroxyl number ranging from 25 to 250.

The flame-retarding additives which may be blended into the polyol composition include compounds used heretofore to impart flame-resistant characteristics to polyurethanes. These compounds usually are soluble in or miscible with the polyol or mixture thereof and, hence, may be intimately blended therewith by physical mixing. Specific compounds of this type include chlorinated paraffin hydrocarbons containing from about 38 percent up to about 75 percent chlorine, by weight; halogenated phosphates, phosphites, phosphonates, etc.; organic antimonites such as tris(2-chloroethyl)antimonite, tris(2-chloropropyl)antimonite and the like; antimonyl derivatives of metallic salts of aliphatic, a-hydroxy, mono- and polybasic organic acids, e.g., potassium and antimonyl tartrate, potassium antimonyl mucate, potassium antimonyl lactate, barium antimonyl tartrate, lithium antimonyl tartrate and the like; and antimonous halides such as antimony trichloride. For imparting flame retardance to polyurethane products, these additives generally may be used in an amount ranging from about 0.5 percent to about 25 percent, by weight, based on the total polyol-polyisocyanate reaction mixture employed.

The polyol composition preferably treated in the practice of this invention contains, by weight, from 2 percent up to about 30 percent halogen, e.g., chlorine, and from about 0.1 percent up to about 12 percent antimony. This polyol composition and its preparation are described in copending application Ser. No. 436,315, filed Mar. 1, 1965. It is a liquid product obtained by reacting together at least one organic polyhalogenide, at least one organic polyhydroxy compound which is preferably a polyether and a trivalent antimony compound. The organic polyhalogenides typically employed presently are organic polychlorides such as, for example, paraffinic, olefinic or diolefinic hydrocarbons which contain from about 38 percent up to about 75 percent chlorine, by weight.

A flame-retardant polyol composition such as described herein typically contains free acid, which acid may contribute to the degradation observed in foam masses prepared therefrom. After treatment with the epoxide material, the acidity of the polyol is found to be markedly reduced by comparison to that of the untreated polyol. Subsequently, a polyol so treated remains substantially stable, exhibiting so significant change in acid content even after continued storage for extended time periods.

The acid number, i.e., the acidity or the active $H^+$ concentration of the polyol composition is determined, both before and after epoxide treatment, essentially under nonaqueous conditions as follows, using as a standard a commercial polyol of known acidity. A quantity of the commercial polyol which contains from 0.0005 to 0.0010 $H^+$ equivalent is measured into a container. Two-hundred ml. of isopropanol is added and the polyol material is dissolved therein with stirring. The quantity (milliliters) of 0.05 N methanolic sodium hydroxide solution required to neutralize the acidity of this polyol is calculated, which calculated quantity is then added to the polyol-isopropanol solution. The final pH of the solution is observed and recorded.

A similar quantity of the flame-retardant polyol composition is dissolved in isopropanol as described above. While observing the pH of the resulting solution, the standard sodium hydroxide is titrated therein until the final pH of this solution is the same as that of the commercial polyol. The number of milliliters of standard sodium hydroxide solution used is recorded. The acid number of the flame-retardant polyol composition is then calculated using the following equation:

$$\frac{\text{ml. (NaOH)} \times \text{N(NaOH)} \times 56.1}{\text{weight sample, g.}} = \text{Acid Number}^1$$

[1] Milligrams of potassium hydroxide/gram of sample.

Wherein 56.1 is the equivalent weight of potassium hydroxide.

Because of its antimony content, the polyol composition preferably employed in the process of this invention is autocatalytic. That is to say, it will, in most instances, readily react with polyisocyanates in the absence of catalysts such as are normally used to initiate the urethane reaction. The catalytic efficiency of this polyol is further enhanced by the process of this invention so that polyurethane products, as foams, generally may be prepared therefrom in much faster reaction times than can be realized when employing the untreated composition. Of course, it is to be understood that the catalytic efficiency of the treated polyol may be further modified by formulation with conventional urethane catalysts, if desired.

In general, the improved polyol composition of this invention may be employed to prepare polyurethane plastics by molding, casting, coating or laminating techniques as presently practiced. It is particularly adapted to the preparation of rigid low-density foam materials which possess good dimensional stability, low thermal conductivity and excellent resistance to water absorption and to chemical attack. Generally, these foam products exhibit substantially less discoloration in or toward the center sections thereof by comparison to similar foams prepared from analogous polyol compositions not treated by the process of this invention. The preferred foam products appear to possess significantly improved resistance to heat degradation, showing no susceptible discoloration or other evidence of degradation in cross section.

To prepare polyurethane foam products, the treated polyol composition of this invention is reacted with a polyisocyanate in the presence of a foaming or blowing agent and usually in the presence of a foam stabilizer. When employing those polyol compositions which do not contain antimony, it is also necessary to incorporate in the foam formulation a catalyst such as is conventionally used to initiate the urethane reaction. Other ingredients which may be used in the formulation, if desired, include organic and inorganic fillers, color pigments, dyes, antioxidants and the like.

Polyisocyanates suitable for use include any of the polyisocyanates commercially available at the present time which have two, three or more reactive isocyanate groups. Examples of such polyisocyanates which may be either aliphatic or aromatic compounds include tetra- and hexamethylene diisocyanate, arylene-diisocyanates and their alkylation products such as the phenylene diisocyanates, naphthylene diisocyanates, diphenyl methane diisocyanates, toluene diisocyanates, di- and triisopropyl benzene diisocyanates and triphenyl methane triisocyanate; aralkyl diisocyanates such as 1-(isocyanatophenyl)-ethyl isocyanate or the xylylene diisocyanates. Examples of specific polyisocyanates include polymethylene polyphenyl isocyanate, toluene diisocyanate (available as mixed 2,4- and 2,6-isomers), crude diphenylmethane-4,4-diisocyanate, 3,3'-dimethoxy-4,4'-diphenylene diisocyanate, and 1,5-naphthyl diisocyanate.

Suitable foaming or blowing agents include, for example, water and organic liquid compounds which vaporize at, or substantially below the temperature of the foaming reaction mass. Such volatile compounds may be, for example, lower molecular weight alkanes and alkenes, halogen-substituted lower molecular weight alkanes and lower molecular weight dialkyl ethers.

As the foam stabilizing component, suitable compounds include salts of long chain fatty acids, salts of sulfates or sulfonates of high molecular weight organic compounds, reaction products of ethylene oxide with a long-chain alcohol, an acid or amine or with an alkyl phenol and liquid polydialkylsiloxanes and polysiloxane-polyalkylene oxide block copolymers. Economical chlorinated aliphatic hydrocarbons may, in some instances, also be used as auxiliary foam stabilizers.

Conventional urethane reaction catalysts which are employed as required include, for example, a wide variety of organic tin catalysts, tertiary amine catalysts, etc. and combinations thereof.

In preparing foam materials, the polyisocyanate component generally is used in an excess amount with respect to the polyol component, i.e., in an amount contributing generally from 1.00 to 2.00 isocyanate equivalents and preferably from 1.00 to 1.20 isocyanate equivalents for each hydroxy equivalent of the polyol. In formulating, the treated polyol composition of this invention may be employed singly or it may be advantageous, in some instances, to also employ therewith a polyhydric compound or compounds so as to provide additional hydroxyl groups for cross-linking with isocyanate groups. Suitable polyhydric compounds are, for example, monomeric diols, triols and polyols normally used in the preparation of polyurethane plastics. Additionally, it is also possible to use blends of, for example, conventional polymeric polyols and/or phosphorus-containing hydroxy compounds with the treated polyol composition of this invention.

In addition to cellular polyurethane products the polyol composition of this invention may also be advantageously employed to prepare other polyurethane products such as coatings, moldings or laminates which exhibit improved resistance to heat degradation and excellent color homogeneity.

In order that those skilled in the art may better understand the present invention and the preferred methods by which it may be practiced, the following specific examples are offered. In these examples and elsewhere herein, where proportions of ingredients are expressed in parts, such proportions are by weight.

Example 1

A polyether polyol composition is prepared as set forth in the above-mentioned copending patent application, U.S. Ser. No. 436,315 as follows.

A 100-gallon, glass-lined, jacketed reactor is equipped with a thermocouple, an agitator and nitrogen purging facilities. Three-hundred seventy-eight pounds of an oxypropylated sorbitol (OH number=490), 168 pounds of an oxypropylated sorbitol (OH number=650), 140 pounds of a chlorinated propylene trimer (containing 70 percent chlorine, by weight) and 14 pounds of antimony trioxide are charged to the reactor and blended together with agitation. The system is then purged with nitrogen. While nitrogen purging is continued, the agitated mixture is then heated slowly to 160° C. and maintained at this temperature until the suspended antimony trioxide disappears and a homogeneous product solution is formed (about 3 hours reaction time). Heating is then discontinued and the product solution is quickly cooled. This product has a hydroxyl number of 469, which value is determined by the method outlined in Siggia, S., "Quantitative Organic Analysis via Functional Groups," 2nd edition, Wiley and Sons, Inc., page 9 (1958). Elemental chemical analysis indicates the product contains 14.8 percent combined chlorine and 1.7 percent antimony, by weight. The acid number of this polyol is 14.5.

A foam formulation is prepared by first blending 600 parts of this polyol product, 12 parts of DC–202 silicone oil (marketed by Dow Corning) and 192 parts of trichlorofluoromethane blowing agent together at ambient temperature until a homogeneous solution is obtained. Six-hundred-ninety parts of crude diphenylmethane 4,4'-diisocyanate (such as Mondur MR, manufactured by Mobay Chemical) is then rapidly mixed into this solution. The foam mixture is quickly poured into a mold of one cubic foot capacity wherein the mixture expands to maximum height in 142 seconds. The finished foam has a density of 2.02 pounds per cubic foot, is of uniformly fine cell structure and is rated as non-burning when tested in accordance with ASTM D–1692 flammability test procedures. The center section of this foam block is light to medium brown in color, whereas the area away from its center is very light tan. This foam product is used as a control in measuring the improved resistance to heat degradation exhibited by the foam products of this invention which are described in the following examples.

Example 2

At room temperature, 600 parts of the polyol product of Example 1 is blended with 12 parts of propylene oxide (2 percent of propylene oxide, by weight of the polyol). The resulting polyol-propylene oxide blend is then stored for 24 hours. After storage, the acid number of this material is 1.33. Six-hundred parts of the aged blend is mixed at room temperature with 12 parts of L–5310 silicone oil (marketed by Union Carbide) and 192 parts of trichlorofluoromethane blowing agent. A homogeneous solution is obtained. Six-hundred-ninety parts of Mondur MR is then added and rapidly mixed into this solution. The foam mixture is poured into a mold of one cubic foot capacity wherein it foams and reaches maximum height in 69 seconds. The finished foam is similar in appearance to the foam product of Example 1, being of uniformly fine cell structure. It has a density of 1.94 pounds per cubic foot and is rated as nonburning, tested as described in the previous example. Examination of this foam product in cross-section shows little or no discoloration in its center section, by comparison to the foam product of Example 1.

Example 3

To illustrate the reduction in acidity effected in the flame-retardant poylol composition by treatment with an epoxide material, separate portions of the polyol product of Example 1 are blended at room temperature with different percentages of propylene oxide, by weight. The acid number of each of the resulting blends is then determined at prescribed time intervals after preparation with the following results:

TABLE I

| Percent propylene oxide, by weight | Acid number [1]—hours after preparation | | | | |
|---|---|---|---|---|---|
| | 0.5 | 1.0 | 4 | 24 | 48 |
| 1 | 8.55 | 6.66 | 5.39 | 3.25 | 3.45 |
| 2 | 6.81 | 3.72 | 2.60 | 1.33 | 0.81 |
| 4 | 5.38 | 1.48 | 1.16 | 0.54 | 0.38 |

[1] Acid number of untreated polyol=14.5.

Example 4

At room temperature, separate portions of the polyol product of Example 1 are blended with different epoxide materials as listed in the following table. After preparation, the resulting blends are aged for 60 hours. Six-hundred parts of each aged blend is then mixed with 12 parts of a silicone oil and 192 parts of trichlorofluoromethane blowing agent. Six-hundred-ninety parts of Mondur MR is rapidly blended into each mixture. The resulting foam formulations are each poured into molds as previously described wherein foaming of the mixtures takes place. The foam times and density of the foam products are as follows:

TABLE II

| | Epoxide used/percent polyol | | | |
|---|---|---|---|---|
| | Epichlorohydrin | | Araldite 6010 [1] | Epon 828 [2] |
| | 2.5 | 5 | 5 | 5 |
| Foam time, sec | 71 | 59 | 121 | 142 |
| Foam density, lbs./cu. ft | 1.9 | 2.0 | 2.10 | 2.16 |

[1] Liquid epoxy resin (epoxy value=0.51–0.54/100 g.), manufactured by Ciba Products Company.
[2] Liquid epoxy resin (epoxy value=0.52–0.54/100 g.), manufactured by Shell Chemical Company.

The foam products of this example are similar in appearance to the products of the previous examples. None of these foams exhibit any susceptible discoloration in cross-section. They are all rated as non-burning tested in accordance with ASTM D–1692 flammability test procedures.

Example 5

This example illustrates that degradation such as observed in polyurethane foams prepared from a blend of the flame-retardant polyol with a conventional polyol is markedly reduced by employing a flame-retardant component treated by the process of this invention. A foam product is prepared by blending together 240 parts of the polyol product of Example 1, 360 parts of an oxypropylated sucrose polyol having an hydroxyl number of 467 (such as the product manufactured by Atlas Chemical Industries, 15 parts of L–5320 silicone oil and 180 parts of trichlorofluoromethane. Six-hundred eighty-four parts of Mondur MR are added and mixed into this blend. The resulting foam mixture is poured into a mold as used previously wherein it foams and reaches maximum height in 244 seconds. The finished foam has a density of 2.2 pounds per cubic foot. It is rated as self-extinguishing by ASTM D–1692 test methods. The center section of this foam is extremely discolored, being twice as dark as the control sample.

Another polyol blend is prepared employing 300 parts of the oxypropylated sucrose polyol and 300 parts of the polyol product of Example 1, which previously had been blended with 4% propylene oxide, by weight and then aged for at least 24 hours. A foam mixture is formulated with this polyol blend using the same ingredients as described above in the same proportions. The foam mixture is poured into a similar-type mold wherein it foams and reaches maximum height in 102 seconds. The density of the finished foam is 2.2 pounds per cubic foot. Tested as described previously, the foam exhibits self-extinguishing characteristics. In cross-section, this foam exhibits no susceptible discoloration or color unevenness.

Example 6

Employing the same procedure and foam recipe as outlined in Example 5, a polyurethane foam product is prepared. As the polyol component of the foam formulation, a blend is employed which contains, by weight, 65 percent of an oxypropylated sorbitol polyol having OH number of 445 (such as G–2571 polyol manufactured by Atlas Chemical Industries) and 35 percent of the untreated flame-retardant polyol product of Example 1. The foam mixture prepared expands to maximum height in 142 seconds. The finished foam has a density of 2 pounds per cubic foot and is rated as self-extinguishing when tested according to ASTM D–1692. The discoloration observed in the cross-section of this foam is equivalent to that of the control foam.

Another foam formulation is similarly prepared using as the flame-retardant polyol component the treated, aged polyol product used in Example 5. The resulting foam mixture expands to maximum height in 71 seconds. The finished foam has a density of 1.9 pounds per cubic foot and is self-extinguishing. It shows no susceptible discoloration or color unevenness.

Examples 7–11

In these examples, polyurethane foam products are prepared as previously described, using as the polyisocyanate component another commercially available polymethylene polyphenyl isocyanate (PAPI) in place of Mondur MR. As shown in the following table, the untreated polyol product of Example 1 is employed in one formulation, while the polyol component employed in the remaining formulations is a blend of this polyol product with the epoxide materials as listed. All of the treated polyol components have been aged for 1 week prior to use. The foam formulations prepared, the foam rise (expansion) times, the density and flammability rating of the finished foams are as follows:

TABLE III

| Example | 7 | 8 | 9 | 10 | 11 |
|---|---|---|---|---|---|
| Untreated polyol (parts) | 600 | | | | |
| Polyol blended with— | | | | | |
| 5% Araldite Epoxy 6010 [1] (parts) | | 600 | | | |
| 5% Epon 828 [1] (parts) | | | 600 | | |
| 2.5% Epichlorohydrin (parts) | | | | 600 | |
| 4% Propylene Oxide (parts) | | | | | 600 |
| L-5310 silicone oil | 15 | 15 | 15 | 15 | 15 |
| Trichlorofluoromethane | 194 | 194 | 194 | 194 | 194 |
| PAPI [2] | 695 | 695 | 695 | 695 | 695 |
| Foam rise, seconds | 145 | 101 | 83 | 108 | 82 |
| Density, pounds per cubic foot | 2.06 | 2.10 | 2.21 | 2.10 | 1.79 |
| Flammability rating (ASTM D-1692-59T) | ([3]) | ([3]) | ([3]) | ([3]) | ([3]) |

[1] As described previously.
[2] Polymethylene polyphenyl isocyanate (Upjohn Company).
[3] Nonburning.

The foam product of Example 7 prepared from the untreated polyol is discolored in its center, while the foam products of the other examples (prepared from the treated polyols) show no susceptible discoloration.

Example 12

A polyether polyol composition is prepared as described in Example 1, employing as the reactor, a three-liter, three-necked, round-bottom flask equipped with a thermometer, an agitator, a trap fitted to a reflux condenser, a heating mantle and nitrogen inlet and outlet tubes. The reaction mixture contains, by weight, 39.75% of an oxypropylated sorbitol (OH number=490), 34.5 percent of an oxypropylated sorbitol (OH number=650), 25.0 percent of a chlorinated propylene trimer (containing 70 percent chlorine, by weight) and 0.75 percent of antimony trioxide. While being purged with nitrogen, the reaction mixture is heated to 160° C. and then maintained at this temperature for 3 hours, during which time the suspended antimony trioxide disappears and a homogeneous product is obtained. This polyol product has a hydroxyl number of 442, contains 12 percent chlorine and 0.6 percent antimony, by weight, and has an acid number of 5.58.

A portion of this polyol (600 parts) is blended with 12 parts of L-5310 silicone oil and 180 parts of trichlorofluoromethane, after which 654 parts of Mondur MR is added to the resulting blend of these ingredients. The foam mixture obtained is poured into a mold wherein it expands to maximum height in 390 seconds. The finished foam has a density of 2.24 pounds per cubic foot and is rated as non-burning. This foam exhibits a slight discoloration in or toward the center section.

Another portion of the above-described polyol product (600 parts) is blended with 1 percent propylene oxide, by weight. After blending, the treated polyol is stored for 1 day. After aging, the acid number of this polyol is 0.2. It is then incorporated in a foam formulation using therewith the same other foam ingredients in the same quantities as described above. This foam mixture expands to maximum height in 134 seconds, and the finished foam has a density of 2.08 pounds per cubic foot. It exhibits flammability characteristics similar to the previously described foam product of this example. However, this foam exhibits no susceptible discoloration or any color unevenness.

It is to be understood that although the invention has been described with specific reference to particular embodiments thereof, it is not to be so limited, since changes and alterations therein may be made which are within the full intended scope of this invention as defined by the appended claims.

What is claimed is:
1. A reactive hydroxyl group-containing composition useful in the preparation of flame-retardant polyurethane foam products having a high degree of thermal stability, which composition consists essentially of a physical blend of a polyol having an hydroxyl number ranging from 25 to 600 and having incorporated therein from 0.5 to about 25 percent, by weight, of at least chlorine as flame-retarding agent, with from 0.5 percent up to 25 percent, based on the weight of the polyol, of a compound having at least one epoxide group in its structure which serves to scavenge free acid from the polyol and reduce the acid number thereof; said polyol being selected from the group consisting of polyalcohols, hydroxy-polyesters, polyethers and polyesteramides; and said epoxide group-containing compound being selected from the group consisting of alkylene oxides, aralkylene oxides, halogenated alkylene oxides and epoxy resins having an epoxy value of at least 0.10 per 100 grams of resin.

2. The composition of claim 1 wherein the epoxide group-containing compound employed is propylene oxide.

3. The composition of claim 1 in which the polyol contains, in addition to chlorine, from 0.1 to 12 percent antimony as flame-retarding agent.

4. The composition of claim 1 in which the chlorine contained in the polyol component is derived from paraffinic, olefinic or diolefinic hydrocarbons which contain from 38 percent to 75 percent chlorine, by weight.

5. The composition of claim 1 in which the polyol component is a polyether polyol selected from the group consisting of branch-chain and linear polyether polyols having at least one acyclic ether linkage and at least two functional hydroxyl groups per molecule and mixtures thereof.

6. The composition of claim 3 in which the antimony component of the polyol is selected from the group consisting of tris(2-chloroethyl) antimonite, tris(2-chloropropyl) antimonite; potassium antimonyl tartrate, potassium antimonyl mucate, potassium antimonyl lactate, barium antimonyl tartrate, lithium antimonyl tartrate and antimony trichloride.

7. The composition of claim 5 in which the polyether polyol component is a branch-chain polyether polyol formed by the condensation of an alkylene oxide with a polyhydroxy aliphatic compound having at least three hydroxyl groups per molecule.

References Cited

UNITED STATES PATENTS

| 3,121,067 | 2/1964 | Nelson | 252—8.1 |
| 3,164,558 | 1/1965 | Eichhorn | 252—8.1 XR |
| 3,271,344 | 9/1966 | Lowes | 252—8.1 XR |
| 3,359,218 | 12/1967 | Wiles | 260—446 XR |

MAYER WEINBLATT, *Primary Examiner.*

U.S. Cl. X.R.

106—17; 117—137; 260—2.5, 446